(12) United States Patent
Osaka et al.

(10) Patent No.: US 6,359,753 B1
(45) Date of Patent: Mar. 19, 2002

(54) FLOATING MAGNETIC HEAD FOR USE WITH FLEXIBLE DISKS

(75) Inventors: Tomohiko Osaka; Norikazu Kudo, both of Yamagata (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/458,127

(22) Filed: Dec. 9, 1999

(51) Int. Cl.⁷ .................................................. G11B 5/60
(52) U.S. Cl. ................................. 360/235.4; 360/246.6
(58) Field of Search ......................... 360/235.8, 236.6, 360/246.2, 246.8, 246.6, 235.4, 234.3

(56) References Cited

U.S. PATENT DOCUMENTS

| | | | | |
|---|---|---|---|---|
| 4,553,184 A | * | 11/1985 | Ogishima ..................... | 360/103 |
| 4,802,042 A | * | 1/1989 | Strom ........................... | 360/103 |
| 5,010,430 A | * | 4/1991 | Yamada et al. .............. | 360/103 |
| 5,184,263 A | * | 2/1993 | Fukakusa et al. ........... | 360/103 |
| 5,309,303 A | * | 5/1994 | Hsia et al. ................... | 360/103 |
| 5,737,151 A | * | 4/1998 | Bolasna et al. .............. | 360/103 |
| 5,748,408 A | * | 5/1998 | Barrois et al. ............... | 360/103 |
| 5,771,133 A | | 6/1998 | Goto et al. ................... | 360/103 |
| 5,973,881 A | * | 10/1999 | Ajiki ............................ | 360/103 |
| 6,104,571 A | * | 8/2000 | Kabasawa ................... | 360/103 |

FOREIGN PATENT DOCUMENTS

| | | |
|---|---|---|
| EP | 60109073 | 6/1985 |
| EP | 62110680 | 5/1987 |
| EP | 0231625 | 8/1987 |
| EP | 0387444 | 9/1990 |
| EP | 05307728 | 11/1993 |
| WO | 96/27873 | 9/1996 |

* cited by examiner

Primary Examiner—Brian E. Miller
(74) Attorney, Agent, or Firm—Ladas & Parry (57) ABSTRACT

A magnetic head including first and second magnetic head units for recording to and reproducing from a first and second flexible rotating recording medium; the second flexible rotating recording medium having a coercive force lower than a coercive force of the first flexible rotating recording medium; a slider, supporting the first magnetic head unit, and having a central groove separating first and second air bearing surfaces, at which the first and second magnetic heads, respectively, are provided. The slider generates an elevating force from air currents generated in a space between the first and second air bearing surfaces and the flexible rotating recording media. The first air bearing surface has a width dimension A1 located on a leading edge side of the magnetic head and substantially perpendicular to a rotating direction from which the first or second flexible rotating recording medium approaches the magnetic head, and a width dimension A2 located on a trailing edge side thereof and substantially perpendicular to the rotating direction, the width dimension A1 being larger than the width dimension A2. An elevating force control slot formed on at least the first air bearing surface can extend in a direction substantially perpendicular to the rotating direction, from which the first or second flexible rotating recording medium approaches the magnetic head, which is essentially identical to the direction from the leading edge toward the trailing edge of the magnetic head, the elevating force control slot having a depth D1, adjacent the central groove, and a depth D2, adjacent the leading edge, the dimension of D2 being greater than the dimension D1.

6 Claims, 8 Drawing Sheets

FLOATING MAGNETIC HEAD FOR USE WITH FLEXIBLE DISKS

BACKGROUND OF THE INVENTION

1. Field of the Invention

The present invention relates generally to a magnetic head, and more particularly, to a magnetic head for recording and reproducing data in a state in which the magnetic head floats over a rotating recording medium, that is, a rotating magnetic disk, due to a change in air flow arising between the magnetic head and the magnetic disk.

2. Description of the Related Art

Generally, an ordinary magnetic disk drive that uses a flexible magnetic disk having a coercive force of 900 oersted (Oe) or less as a magnetic recording medium allows a relatively low rotational speed of for example 300 rpm in this case, magnetic recording and reproduction is performed by causing the magnetic bead to be in direct sliding contact with the magnetic disk.

However, with advances in recent years in high-density recording on magnetic disks, the rotation speed of the magnetic disk has been increased to for example 3000 rpm, with the coercive force of the magnetic disk being increased to 1500 Oe or more. As a result, in order to accommodate such so-called high-capacity magnetic disks a magnetic disk drive has appeared in which the magnetic head is provided with a narrow gap. Hereinafter such a magnetic disk drive will be referred to as a high-capacity magnetic disk drive.

Since a high-capacity magnetic disk drive allows the magnetic disk to be rotated at high speeds, the magnetic disk and the magnetic head used therein may be easily damaged if the magnetic head were to be caused to be in direct contact with the magnetic disk, as is done in the conventional magnetic disk drive.

As a result, the high-capacity magnetic disk drive is designed so that the magnetic head floats in an elevated state over the surface of the high-capacity magnetic disk due to an elevating force arising as a result of a change in an air flow caused by a relative speed between a slider surface of the magnetic head and the magnetic disk. Magnetic recording and reproduction is performed while a state of non-contact between the magnetic head and the magnetic disk is maintained.

Figure 1:
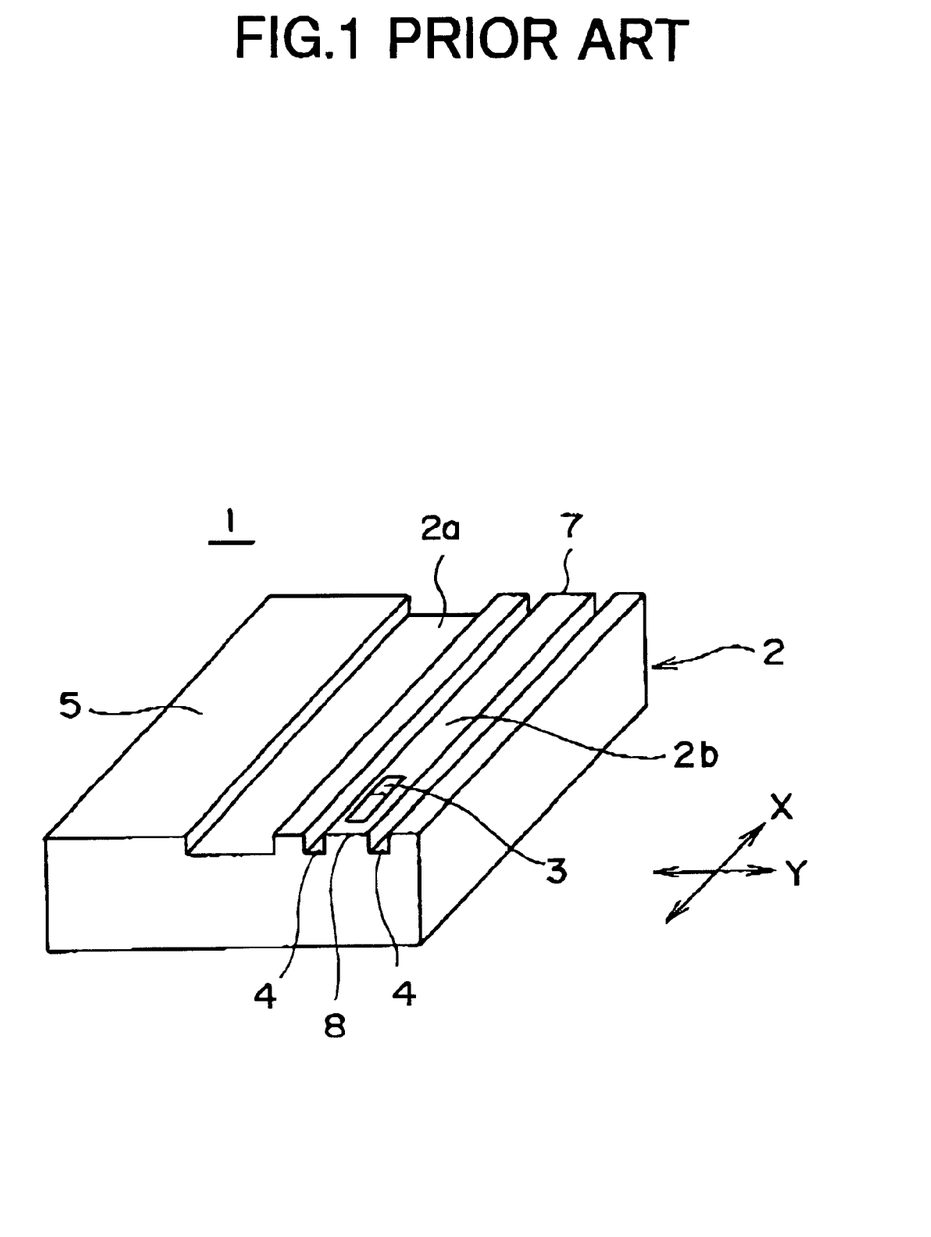
FIG. 1 is a perspective view of a conventional magnetic head for explaining the problems thereof.
Figure 2:
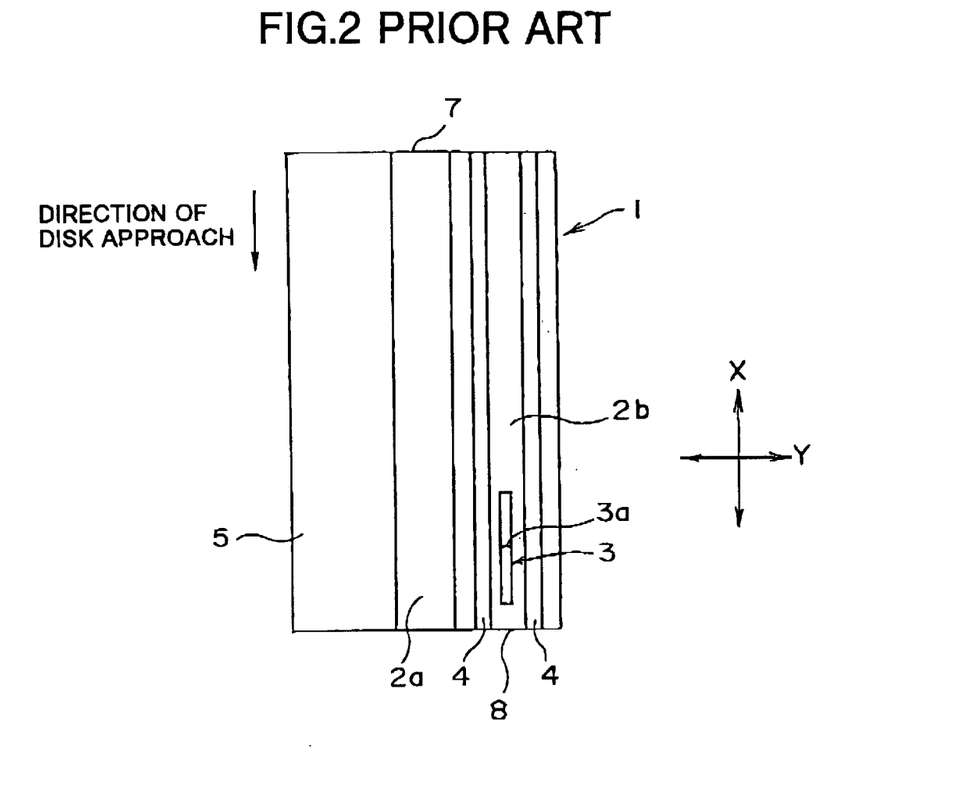
FIG. 2 is a plan view of the conventional magnetic head.

FIGS. 1, 2, 3, 4 and 5 show a magnetic head used in the conventional high-capacity magnetic disk drive. As shown in FIGS. 1 and 2, the conventional high-capacity magnetic head 1 generally comprises a slider 2 and a magnetic head unit 3 The slider 2 supports the magnetic head unit 3 and causes the magnetic head unit 3 to float over the magnetic disk 6.

The top surface of the slider 2 forms an air bearing surface for forming an air bearing with respect to the magnetic disk 6. Additionally, a central groove 2a is formed at a central position of the top surface of the slider 2. As shown in FIG. 1, the central groove 2a divides the air bearing surface into a first air bearing surface 2b located to the right side of the central groove 2a and a second air bearing surface 5 located to the left side.

The magnetic head magnetic head unit 3 and a pair of grooves or slots 4 are provided at the first air bearing surface 2b. The magnetic head unit 3 for performing magnetic recording and reproducing is formed by sandwiching a gap member between thin plates of magnetic cores.

The slots 4 extend in a tangential direction of the magnetic disk 6, that is, in the direction of arrow X in FIG. 1, and provide a vent for an air flow produced between the magnetic disk 6 and the first air bearing surface 2b. By providing a vent to the air flow produced between the magnetic disk 6 and the first air bearing surface 2b, an elevating force exerted on the magnetic head 1 is reduced. Accordingly, by providing the slots 4, the elevating force of the magnetic head 1 can be controlled.

As described above, the second air bearing surface 5 is formed to the left of the central groove 2a located on the top surface of the slider 2 as shown in FIG. 2. Like the first air bearing surface 2b, the second air bearing surface 5 also produces a force for elevating the magnetic head 1.

Figure 3:
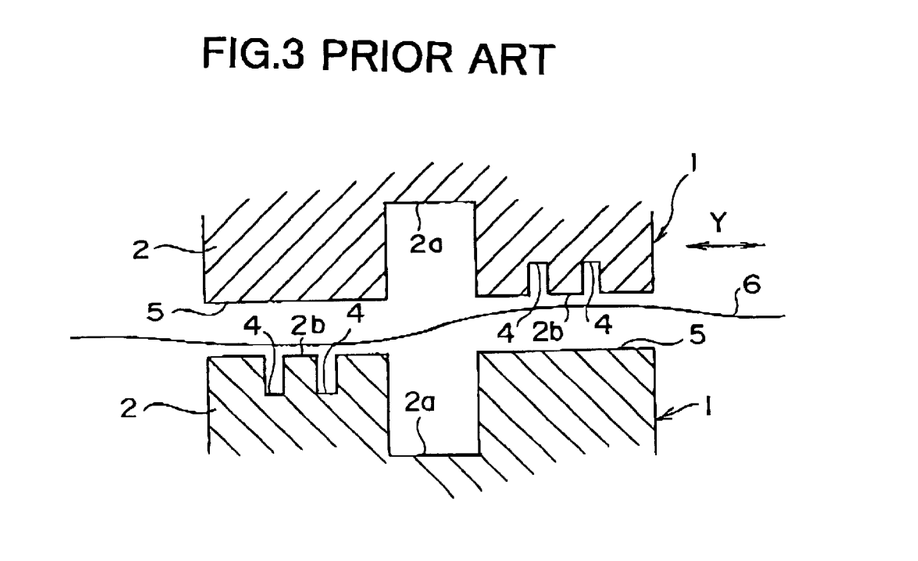
FIG. 3 is a lateral cross-sectional view of the conventional magnetic head from a direction of approach of a disk.

FIG. 3 is a lateral cross-sectional view from a radial direction of disk approach. As shown in the drawing, a pair of magnetic heads are supported so as to be opposite each other within the magnetic disk drive. The elevating force generated by the second air bearing surface 5 described above exerts a force that pushes the magnetic disk 6 in the direction of the first air bearing surface 2b, that is, in the direction of the magnetic head unit 3, of the opposite magnetic head 1. Accordingly, the second air bearing surface 5 also functions as a pressure pad for pressing the magnetic disk 6 toward the opposite magnetic head 1.

Figure 4:
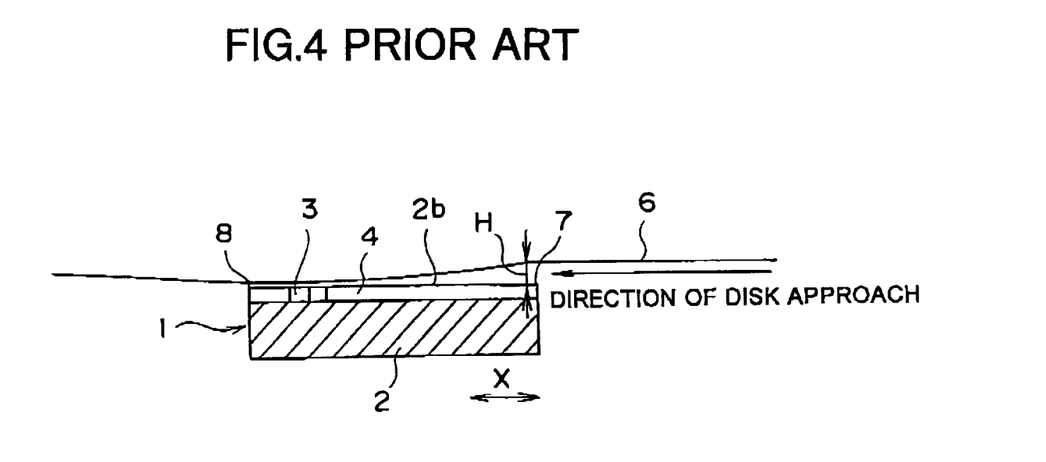
FIG. 4 is a lateral cross-sectional view of the conventional magnetic head from a radial Y direction of a disk for explaining a state of approach of the disk.
Figure 5:
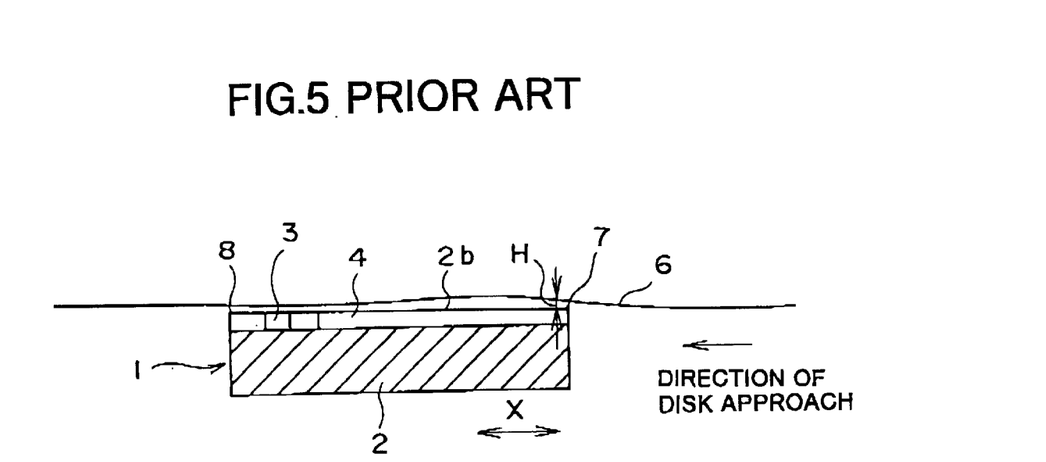
FIG. 5 is a lateral cross-sectional view of the conventional magnetic head for explaining a state in which a height of approach of a disk is lower than a standard optimum height.

Additionally, as described above slots 4 are formed in the first air bearing surface 2b. The slots 4 provide a vent for the air flow produced between the magnetic disk 6 and the first air bearing surface 2b, thus reducing the elevating force exerted on the magnetic head 1. Accordingly, the magnetic disk 6 is deformed by a negative pressure generated in the slots 4 and a pressure generated at the second air bearing surface 5 due to a change in air flow so as to warp toward a gap 3a as the magnetic disk 6 rotates between the pair of magnetic heads 1. With this construction, optimum recording to and reproduction from the magnetic disk 6 is ensured even with floating magnetic heads 1 A description will now be given of how the magnetic heads 1 face the magnetic disk 6, with reference to FIG. 4 and FIG. 5. FIGS. 4 and 5 show views of a state in which the magnetic head 1 is recording to or reproducing from a magnetic disk 6, from a radial Y direction of the magnetic disk 6.

FIG. 4 shows the magnetic disk 6 in a state of optimal approach to the magnetic head 1.

As shown in FIG. 4, a pair of slots 4 are formed in the first air bearing surface 2b in which the first magnetic head unit 3 is provided. These slots 4 are formed along an entire length of the first air bearing surface, that is, a direction indicated in the drawing by the double-headed arrow X, from a leading edge 7 of the magnetic head 1, that is, an edge side of the magnetic head 1 at which the magnetic disk 6 enters the magnetic head 1, to a trailing edge 8 of the magnetic head 1, that is, an edge side of the magnetic head 1 at which the magnetic disk 6 exits the magnetic head 1. As a result, a reduction in the elevating force due to the presence of the slots 4 is generated over the entire extent of the length of the first air bearing surface 2b.

Accordingly, even in a state of optimal approach a distance H between the magnetic disk 6 and the leading edge 7 of the magnetic head 1 in the above-described construction in which the slots 4 are provided is smaller than a corresponding distance in a construction in which the slots 4 are not provided.

Moreover, with such a construction the magnetic disk 6 is maintained in close proximity to the magnetic head unit 3 as a result of the reduction in elevating force by the slots 4, thus providing optimal magnetic recording and reproduction.

By contrast, FIG. 5 shows a state in which the magnetic disk 6 approaches the magnetic head 1 at a height position lower than that of an optimal approach. Such a small-clearance state of approach results from the flexibility of the magnetic disk 6 or from inevitable errors in the production process thereof.

When the height of the magnetic disk 6 upon approach to the magnetic head 1 is lower than a standard optimum height position as described above, the distance H is reduced to such an extent that the magnetic disk 6 may come into contact with the leading edge 7 of the magnetic head 1, and the magnetic disk 6 or the leading edge 7 of the magnetic head 1 may be damaged as a result.

At the same time, although the magnetic disk 6 is ordinarily enclosed in a hard case so as to prevent particles of dirt and dust from adhering to the surface of the magnetic disk 6, it is impossible to completely prevent the attachment of dust thereto, with the result that, inevitably, dust collects on the surface of the magnetic disk 6. If magnetic recording to and reproducing from a magnetic disk 6 to the surface of which dust has adhered is performed using a magnetic head 1, the dust may break loose from the surface of the magnetic disk 6 by the air flow generated at the first and second air bearing surfaces 2b, 5 and adhere to the magnetic heads 1.

As a result, because the width dimension of the slots 4 in the conventional magnetic head 1 is small the flow of air is restricted and thus dust accumulates in the slots 4. If this accumulated dust then breaks loose from the first and second air bearing surfaces 2b, 5, the magnetic disk 6, which is rotating at high speed, may be damaged by collision with the dust or the flow of air may be impaired by the dust, thus impairing proper magnetic recording and reproduction.

SUMMARY OF THE INVENTION

Accordingly, it is a general object of the present invention to provide an improved and useful magnetic head in which the disadvantages described above are eliminated. A more specific object of the present invention is to provide a magnetic head capable of reliably preventing contact between the slider and the recording medium while maintaining a state of optimum magnetic recording and reproduction by preventing the adherence of dust.

The above-described objects of the present invention are achieved by a magnetic head comprising:

a first magnetic head unit for recording to and reproducing from a first flexible rotating recording medium.

a second magnetic head unit for recording to and reproducing from a second flexible rotating recording medium having a coercive force lower than a coercive force of the first flexible rotating recording medium;

a slider supporting the first magnetic head unit, the slider having a central groove separating a first air bearing surface at which the first magnetic head unit is provided and a second air bearing surface at which the second magnetic head unit is provided, the slider generating an elevating force from an a flow generated in a space between the first and second air bearing surfaces and the flexible rotating recording media;

the first air bearing surface having a width dimension A1 located on a leading edge side of the magnetic head and substantially perpendicular to a direction from which the first or second flexible rotating recording medium approaches the magnetic head, and a width dimension A2 located on a trailing edge side thereof and substantially perpendicular to said direction, the width dimension A1 being larger than the width dimension A2; and an elevating force control slot formed on at least the first air bearing surface so as to extend in a direction substantially perpendicular to the direction from which the first or second flexible rotating recording medium approaches the magnetic head, the elevating force control slot having an inside depth D1 and an outside depth D2 greater than the inside depth D1.

According to the invention described above, by making the width dimension A1 larger than the width dimension A2, contact between the leading side edge of the slider and the magnetic disk can be prevented and, further, the first magnetic head unit and the recording medium can be brought into close proximity to each other.

Additionally, by forming the elevating force control slot on at least the first air bearing surface so as to extend in a direction substantially perpendicular to the direction from which the first or second flexible rotating recording medium approaches the magnetic head, the elevating force can be reduced because the air flow arising between the bearing surface and the recording medium can be vented via the elevating force control slot.

Additionally, by making the outside depth D2 greater than the inside depth D1, the air flow generated at the slider flows from inside the elevating force control slot to outside the elevating force control slot. Therefore, dust that has broken loose from the recording media is transported from the inside to the outside via the air flow inside the elevating force control slot, that is, is exhausted to the outside of the magnetic head. As a result, adherence of dust to the magnetic head can be prevented, and further, damage to the recording media can be prevented. At the same time, optimum magnetic recording and reproduction can be maintained.

Further, by adjusting the internal and external depths D1 and D2, respectively, the speed with which air flows through the interior of the elevating force control slot can be controlled, and it is possible to easily set the air flow to a speed that provides optimal elevating force and dust exhaust.

Additionally, the above-described objects of the present invention are also achieved by the magnetic head as described above, wherein a bottom surface of the elevating force control slot is a slanting surface Additionally, the above-described objects of the present invention are also achieved by the magnetic head as described above, wherein at least one step portion is formed on the bottom surface of the elevating force control slot.

According to the inventions described above, the flow of air inside the elevating force control slot from the inside to the outside can be made smooth, and thus the adherence of dust to the magnetic heads can be more effectively prevented.

Additionally,the above-described objects of the present invention are also achieved by the magnetic head as described above, herein a portion of the central groove in the vicinity of the first magnetic head penetrates in a direction of a height of the slider.

According to the invention described above, the volume of air flow can be increased because air flows along a rear surface of the slider as well as the sides of the slider. Accordingly, reduction of the elevating force with respect to the recording medium and the exhaust of dust can be performed more effectively.

Additionally, the above-described objects of the present invention are also achieved by a magnetic head comprising:

a first magnetic head unit for recording to and reproducing from a first flexible rotating recording medium;

a second magnetic head unit for recording to and reproducing from a second flexible rotating recording medium having a coercive force lower than a coercive force of the first flexible rotating recording medium;

a slider supporting the first magnetic head unit, the slider having a central groove separating a first air bearing surface at which the first magnetic head unit is provided and a second air bearing surface at which the second magnetic head unit is provided, the slider generating an elevating force from air currents generated in a space between the first and second air bearing surfaces and the flexible rotating recording media;

the first air bearing surface having a width dimension A1 located on a leading edge side of the first magnetic head and substantially perpendicular to a direction from which the first or second flexible rotating recording medium approaches the magnetic head, and a width dimension A2 located on a trailing edge side thereof and substantially perpendicular to said direction, the width dimension A1 being larger than the width dimension A2; and an elevating force control slot formed on at least the first air bearing surface so as to extend in a direction perpendicular to the direction from which the first or second flexible rotating recording medium approaches the magnetic head and at the same time penetrate in a direction of the height of the slider.

According to the invention described above, by making the width dimension A1 greater than the width dimension A2, contact between the leading side edge of the slider and, further, the first magnetic head unit and the recording medium can be brought into close proximity to each other.

Additionally, by forming the elevating force control slot on at least the first air bearing surface so as to extend in a direction substantially perpendicular to the direction from which the first or second flexible rotating recording medium approaches the magnetic head, the elevating force can be reduced because the air flow arising between the bearing surface and the recording medium can be vented via the elevating force control slot. Thus it is possible to control the elevating force for each bearing surface.

Additionally, by forming the elevating force control slot formed on at least the first air bearing surface so as to extend in a direction perpendicular to the direction from which the first or second flexible rotating recording medium approaches the magnetic head and at the same time penetrate in a direction of the height of the slider, the volume of air flow can be increased because air flows through the elevating force control slot along a back space and both sides of the slider. Accordingly, reduction of the elevating force with respect to the recording medium and the exhaust of dust can be performed more effectively.

Additionally, the above-described objects of the present invention are also achieved by the magnetic head as described above, wherein a depth of the central groove gradually increases as the central groove extends from a formation position of the elevating force control slot toward a trailing edge side of the first or second magnetic heads.

According to the invention described above, the flow of air inside the central groove flows easily from the position at which the elevating force control slot is formed toward the trailing edge side. Thus, dust that has broken loose from the recording media is exhausted from the magnetic heads toward the trailing edge by this flow of air flowing inside the central groove. As a result, the adherence of dust to the magnetic head can be prevented, and further, damage to the recording media can be prevented at the same time as optimum magnetic recording and reproduction can be maintained.

Other objects, features and advantages of the present invention will become more apparent from the following detailed description when read in conjunction with the accompanying drawings.

DESCRIPTION OF THE PREFERRED EMBODIMENTS

A description will now be given of an embodiment of the present invention with reference to the accompanying drawings.

Figure 6:
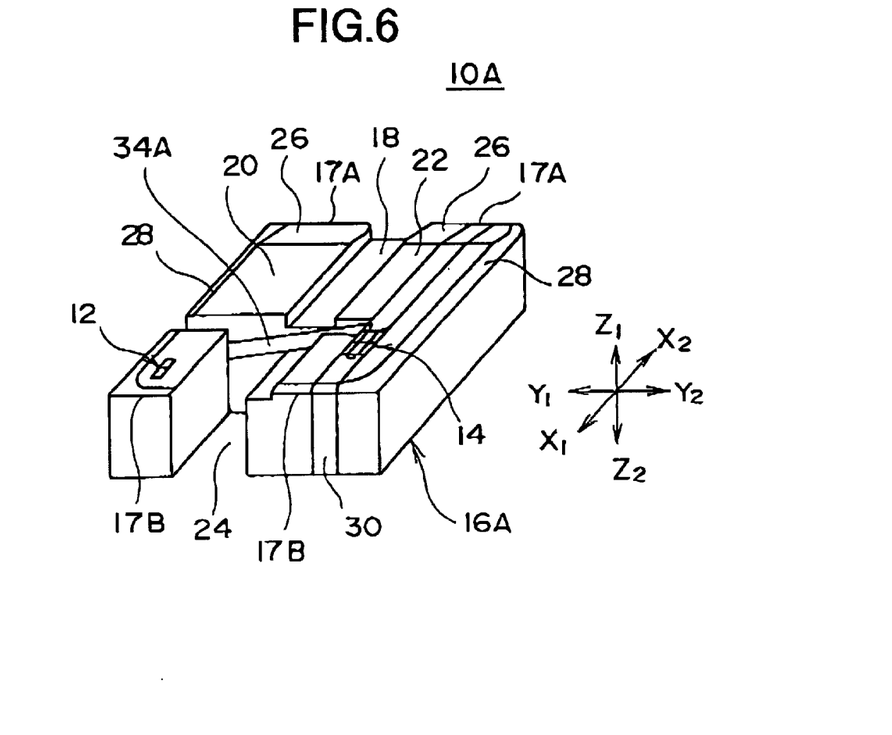
FIG. 6 is a perspective view of a first embodiment of a magnetic head according to the present invention.
Figure 7:
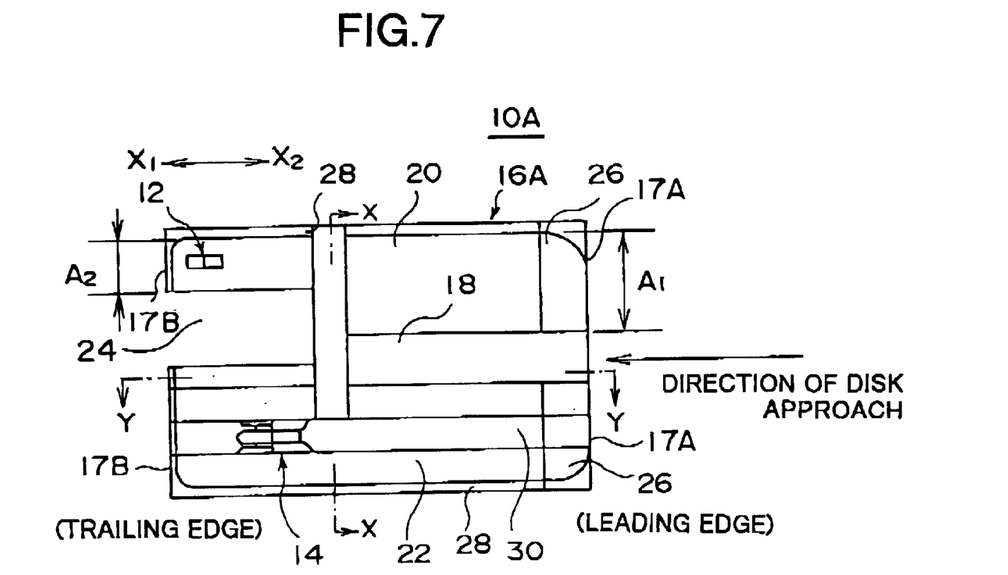
FIG. 7 is a plan view of a first embodiment of is the magnetic head according to the present invention.
Figure 8:
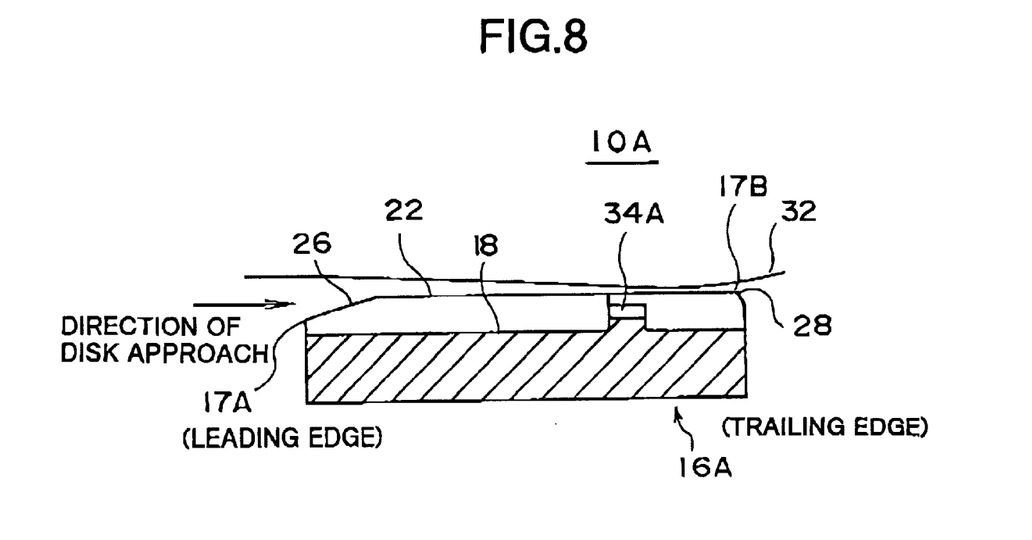
FIG. 8 is a cross-sectional view of the magnetic head shown in FIG. 7 along a line Y—Y therein.
Figure 9:
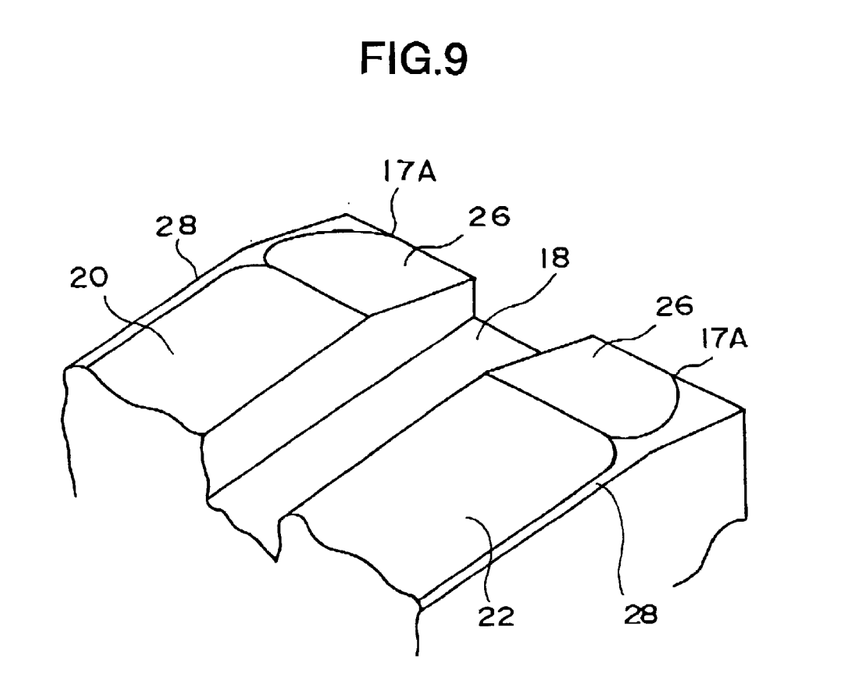
FIG. 9 is an enlarged view of the slanting surface provided on a first embodiment of the magnetic head according to the present invention.
Figure 10:
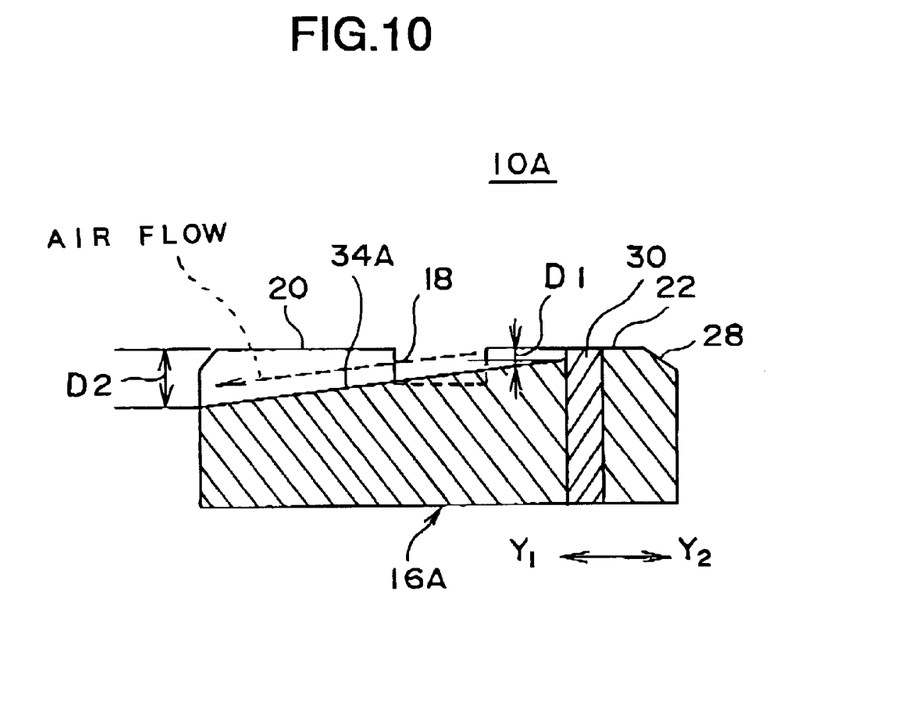
FIG. 10 is a cross-sectional view of the magnetic head shown in FIG. 7 along a line X—X therein.

FIGS. 6, 7, 8, 9 and 10 show a first embodiment of a magnetic head 10A according to the present invention. FIG. 6 is a perspective view of a first embodiment of a magnetic head 10A according to the present invention. FIG. 7 is a plan view of a first embodiment of the magnetic head 10A according to the present invention. FIG. 8 is a cross-sectional view of the magnetic head 10A shown in FIG. 7 along a line Y—Y therein. FIG. 9 is an enlarged view of the slanting surface provided on a first embodiment of the magnetic head 10A according to the present invention. FIG. 10 is a cross-sectional view of the magnetic head 10A shown in FIG. 7 along a line X—X therein.

The magnetic head 10A generally comprises a first magnetic head unit 12, a second magnetic head unit 14 and a slider 16A. The first and second magnetic head units 12, 14 are provided on air bearing surfaces 20, 22 formed on the slider 16A. Of the pair of magnetic head units 12, 14, the first magnetic head unit 12 is a high-capacity magnetic head for magnetic recording and reproduction, and is adapted for magnetic disks, or recording media, having a coercive force of 1500 Oe or more. The second magnetic head unit 14 is a magnetic head for ordinary magnetic recording and reproduction, and is adapted, for example, for magnetic disks having a coercive force of approximately 600–700 Oe. The second magnetic head unit 14 is constructed so that a read/write gap (R/W gap) and an erase gap (E gap) are formed by sandwiching a gap member between magnetic head cores 30. In other words, the magnetic head 10A according to this first embodiment of the present invention has a so-called compatible-type magnetic head structure, capable of performing both ordinary magnetic recording and reproduction as well as high-capacity magnetic recording and reproduction.

The slider 16A is a block member formed, for example, of a ceramic. The slider 16A supports the first and second magnetic head units 12, 14 and also provides a force for elevating the first and second magnetic head units 12, 14 so that the first and second magnetic head units 12, 14 float over a magnetic disk 32. Additionally, the slider 16A is provided with a central groove 18, a first air bearing surface 20, a second air bearing surface 22, an incision 24, a slanting surface 26, a chamfered part 28 and an elevating force control slot 34A.

The central groove 18 is formed at a position in a center of a width of a top surface of the slider 16A, that is, in a direction indicated by arrows Y1–Y2 in the drawing, so as to extend longitudinally in a direction of travel of the magnetic disk 32, that is, in a direction indicated by the arrows X1–X2 in the drawing. By forming the central groove 18, the first and second air bearing surfaces are formed so as to sandwich the central groove of the slider 16A.

In order for the magnetic head 10A to float properly over the magnetic disk 32, the air flow generated between the slider 16A and the magnetic disk 32 must be smooth. It is for this purpose that the first and second air bearing surfaces 20, 22 are formed as highly flat surfaces Additionally, as shown in the enlarged view presented in FIG. 9, the slanting surface 26 extending across a predetermined range is formed on the leading edge of the slider 16A, that is, the X2 edge, from which the magnetic disk 32 approaches. This slanting surface 26 forms an angle of for example 60 minutes or less with respect to the first and second air bearing surfaces 20, 22. By forming the slanting surface 26 on the leading edge of the slider 16A facing the approaching magnetic disk 32, a hard collision between the magnetic disk 32 and the slider 16A can be prevented.

It should be noted that, in the following description, the X1 edge of the slider 16A facing the magnetic disk 32 as it withdraws is referred to as a trailing edge 17B. Additionally, the X2 edge of the slider 16A facing the magnetic disk 32 as it approaches is referred to as the leading edge 17A.

Additionally, a chamfered part 28 is formed on an outer periphery of the first and second air bearing surfaces 20, 22. Providing the chamfered part 28 also prevents the magnetic disk 32 from colliding hard against the slider 16A when the magnetic head 10A is in a floating state.

That is, the slider 16A in a floating state with respect to the magnetic disk 32 affects the magnetic disk 32 such that a movement such as rolling, pitching and the like inevitably occurs depending on the condition of the air flow between the slider 16A and the magnetic disk 32. When this movement is large, it is the periphery portion of the first and second air bearing surfaces 20, 22 that is the first to contact the magnetic disk 32. Thus, by forming the chamfered part 28 on the periphery of the first and second air bearing surfaces 20, 22, the magnetic disk 32 is prevented from colliding hard against the slider 16A.

At the same time, the incision 24 is formed on the X1 side, that is, the trailing edge side, of the central groove 18 formed on the slider 16A. The incision 24 is configured so as to penetrate a thickness direction of the slider, that is, a direction indicated by arrows Z1–Z2 in the drawing The incision 24 is formed so as to control the width of the first air bearing surface 20.

The above-described magnetic head 10A floats over the magnetic disk 32 due to en elevating force generated by a change in air flow caused by a relative speed between the first and second air bearing surfaces 20, 22 of the slider 16A and the magnetic disk 32. As shown in FIG. 8, magnetic recording and reproduction is performed while a state of non-contact between the magnetic head and the magnetic disk 32 is maintained.

A description will now be given of the first air bearing surface 20 formed in the slider 16A of the magnetic head 10A.

As described above, according to the first embodiment the magnetic head 10A is provided with an incision 24 so as to penetrate the thickness of the slider 16A. By forming the incision 24 and by controlling a width thereof in the Y1–Y2 direction, the width A2 of the trailing edge 17B of the first air bearing surface 20 can be controlled.

According to the first embodiment, the incision 24 is formed such that the width A2 of the trailing edge 17B of the first air bearing surface 20 is smaller than the width A1 of the leading edge 17A of the first air bearing surface 20, that is A1>A2. More specifically, the width A2 at the trailing edge 17B is set to be less than or equal to one-third the width A1 at the leading edge 17A, that is, A2 (2·A1/3).

By setting the width A1 of the first air bearing surface 20 to be equal to or larger than the width A2 at the trailing edge 178 contact between the leading edge 17A and the magnetic disk 32 can be prevented and at the same time the magnetic disk 32 can be maintained in close proximity to the first magnetic head unit 12.

A description will now be given of the reason for the above-described advantages.

The elevating force generated between the first air bearing surface 20 and the magnetic disk 32 is related to the surface area of the first air bearing surface 20. That is, the elevating force is generated as a result of the air flow between two opposed parts, the first air bearing surface 20 and the magnetic disk 32. As a result, the larger the surface area of the first air bearing surface 20, the larger the elevating force.

Accordingly, by setting the width A2 of the trailing edge 17B of the first air bearing surface 20 to be smaller than the width A1 of the leading edge 17A thereof, the surface area of the trailing edge 17B of the first air bearing surface 20 is made smaller than the surface area of the leading edge 17A thereof. That is, the elevating force generated between the first air bearing surface 20 and the magnetic disk 32 is greater at the leading edge 17A of the first air bearing surface 20 and smaller at the trailing edge thereof Accordingly, as shown in FIG. 8, a state arises in which the magnetic disk 32 is distant from the first air bearing surface 20 at the leading edge 17A of the first air bearing surface 20 while the magnetic disk 32 is in close proximity to the first air bearing surface 20 at the trailing edge 17B thereof, that is, a position near the first and second magnetic head units 12, 14, By thus keeping the magnetic disk 32 and the first air bearing surface 20 widely separated at the leading edge 17A, the leading edge 17A can be prevented from contacting the magnetic disk 32 even when the magnetic disk 32 approaches the magnetic head 10A at a smaller than optimal clearance, that is, lower than a standard optimum height position, and thus the magnetic disk 32 can be prevented from being damaged.

Additionally, it is possible to bring the magnetic disk 32 into close proximity to the first magnetic head unit 12 because the elevating force decreases at the trailing edge. By bringing the first magnetic head unit 12 and the magnetic disk 32 into close proximity to each other, it is possible to perform strong magnetic recording when recording and it is possible to obtain strong reproduction signals when reproducing.

At the same time, according to the magnetic head 10A of the present embodiment, an elevating force control slot 34A is formed on the first and second air bearing surfaces 20, 22 so as to extend in a direction perpendicular to the direction of travel of the magnetic disk 32, that is, in a Y1–Y2 direction. More specifically, the elevating force control slot 34A is formed so as to extend from a side part of a magnetic head core 30 toward the first air bearing surface 20.

By forming the elevating force control slot 34A the elevating force is reduced, because the flow of air between the air bearing surfaces 20, 22 and the magnetic disk 32 at a position at which the elevating force control slot 34A is formed is vented via the elevating force control slot 34A.

Additionally, by making a bottom surface of the elevating force control slot 34A into a slanting surface according to the first embodiment, an outside depth D2 at an outer periphery of the slider 16A is set to be greater than an inside depth D1 at a position adjacent to the magnetic head core 30, that is, D2 D1. According to this construction, the surface area of the passageway through which the air flows expands from the inside toward the outside, so the air flow generated between the first and second air bearing surfaces 20, 22 and the magnetic disk 32 flows from the inside toward the outside via the elevating force control slot 34A, that is, in a direction indicated by a dotted-line arrow shown in FIG. 10.

However, as previously noted, although the magnetic disk 32 is enclosed in a hard case so as to prevent particles of dirt and dust from adhering to the surface of the magnetic disk 32, it is impossible to completely prevent the attachment of dust thereto, with the result that, inevitably, dust collects on the surface of the magnetic disk 32. Additionally, if the magnetic disk 32 is used for an extended period of time, magnetic particles may come loose from the magnetic disk 32. Hereinafter, such magnetic particles and other particles of dirt and dust are referred to as simply dust. If this dust adheres to and accumulates at and breaks loose from a surface of the slider 16A that is opposite the magnetic disk 32, then, as noted previously, the magnetic disk 32 may be damaged and it may become impossible to perform optimum magnetic recording and reproduction.

However, by providing the elevating force control slot 34A having an outside depth D2 greater than an inside depth D1, dust that has broken loose from the magnetic disk 32 is borne from the inside to the outside by the flow of air inside the elevating force control slot 34A, that is, the dust is exhausted to the outside of the magnetic head 10A in particular, according to the present embodiment the flow of air can be made smooth because the bottom surface of the elevating force control slot 34A is a slanting surface.

As a result, the adherence and accumulation of dust on the magnetic head 10A can be prevented and the occurrence of damage to the magnetic disk 32 caused by dust can be prevented. At the same time, optimum magnetic recording and reproduction can be achieved because a steady flow of air can be obtained and the separation distance between the first magnetic head unit 12 and the magnetic disk 32 can be stabilized.

Additionally, in a state of formation of the elevating force control slot 34A, for example by mechanical processing or the like, it is relatively easy to control the extent of the inside depth D1 and the 315 outside depth D2 thereof. As described above, the speed and volume of air flow through the interior of the elevating force control slot 34A can be controlled by the shape of the elevating force control slot 34A, that is, the surface area of the passageway. Thus, by shaping the elevating force control slot 34A as appropriate during the a fabrication thereof, it is possibly to easily achieve an air flow speed and volume optimal for both the elevating force and the elimination of dust.

A description will now be given of a variation of a first embodiment of a magnetic head according to the present invention.

Figure 11:
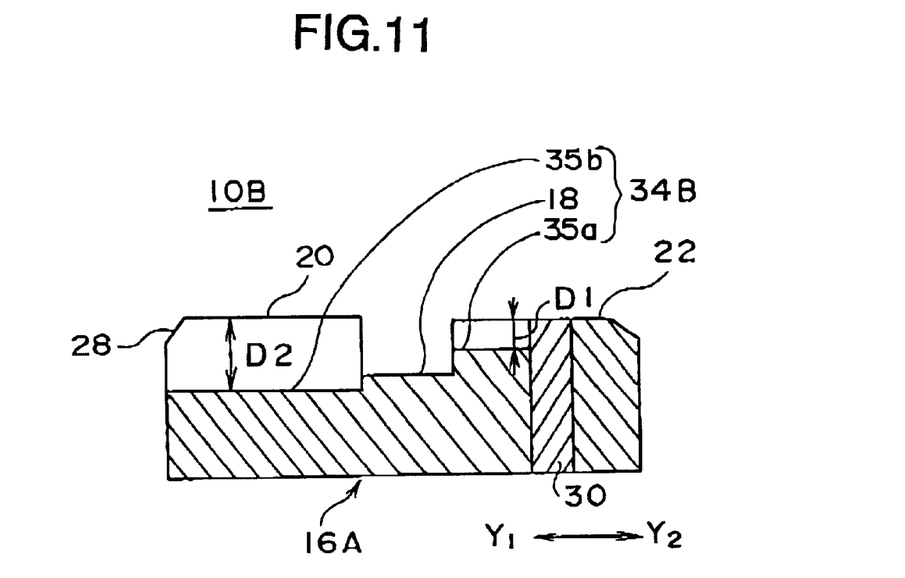
FIG. 11 is a cross-sectional view of a variation of a first embodiment of the magnetic head according to the present invention.

FIG. 11 is a cross-sectional view of a variation of a first embodiment of the magnetic head according to the present invention, at a point identical to the cross-sectional view shown in FIG. 10.

The above-described magnetic head 10A according to the first embodiment has an outside depth D2 greater than an inside depth D1, so the bottom surface of the elevating force control slot 34A comprises a smoothly continuous slanting surface.

By contrast, the magnetic head 10B according to the present variation of the first embodiment has a first step portion 35a that is shallower than the central groove 18, the first step portion 35a being formed on the second air bearing surface 22, and similarly, a second step portion 35b that is deeper than the central groove 18, the second step portion 35b being formed on the first air bearing surface 20. Thus, the distinctive feature of the present variation is that the elevating force control slot 34A comprises the first step portion 35a, the second step portion 35b and the central groove 18 as described above.

Like the first embodiment of the magnetic head 10A according to the present invention, the construction of the magnetic head 10B according to the present variation of the first embodiment as described above also provides an outside depth D2 of the elevating force control slot 34A that is greater than an inside depth D1 thereof, thus smoothing the flow of air from the inside toward the outside within the elevating force control slot 34A. As a result, the magnetic head 10B according to the present variation achieves the same effect as does the magnetic head 10A according to the first embodiment.

It should be noted that, although in the above-described embodiment and variation the elevating force control slots 34A and 34B are formed so as to extend from a position adjacent to the magnetic head core 30 toward the first air bearing surface 20, the elevating force control slots 34A and 34B are not limited to the above-described formation positions but may instead be formed so as to extend from the central groove 18 toward the first air bearing surface 20, or extend along only the first air bearing surface 20.

Figure 12:
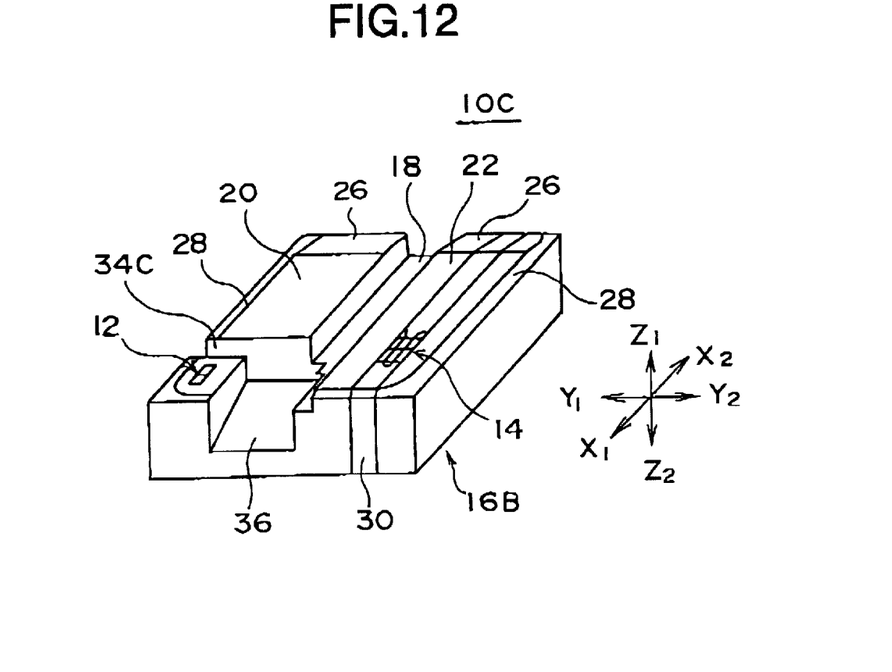
FIG. 12 is a perspective view of a second embodiment of a magnetic head according to the present invention.
Figure 13:
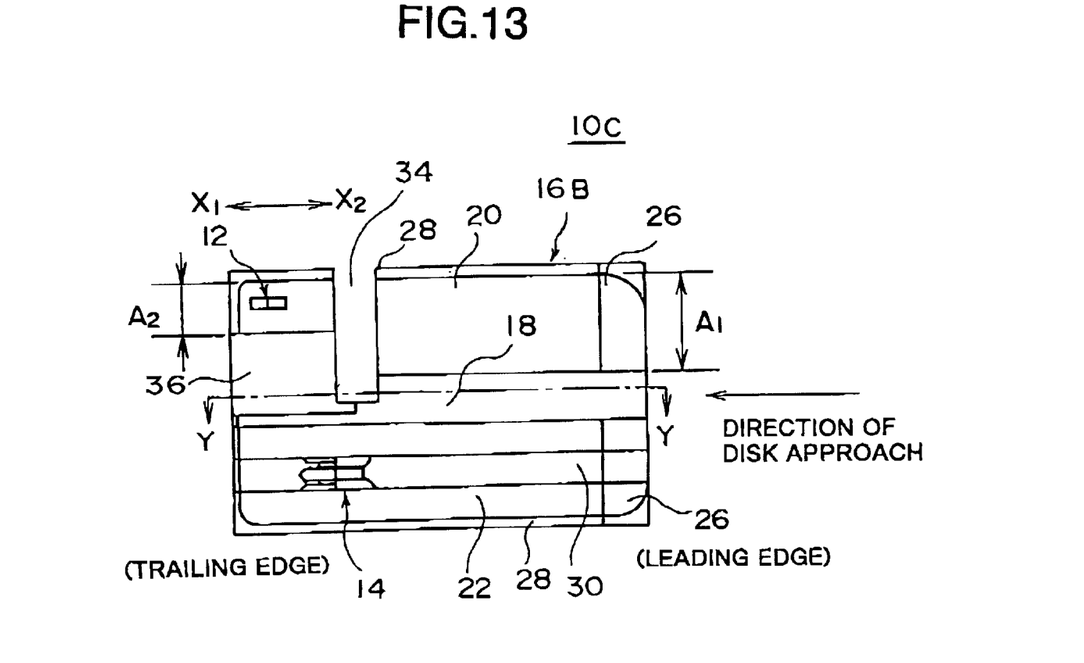
FIG. 13 is a plan view of a second embodiment of the magnetic head according to the present invention.
Figure 14:
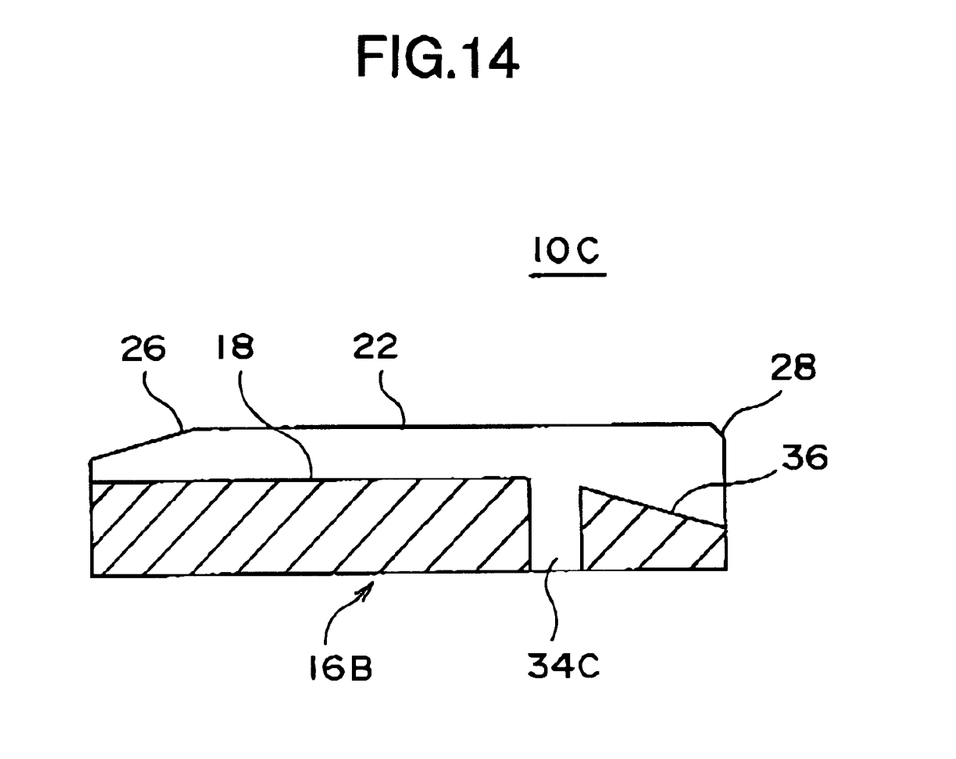
FIG. 14 is a cross-sectional view of the magnetic head shown in FIG. 13 along a line Y—Y therein.

Next, a description will be given of a second embodiment of a magnetic head 10C according to the present invention, with reference to FIGS. 12, 13 and 14. FIG. 12 is a perspective view of the magnetic head 10C, FIG. 13 is a plan view of the magnetic head 10C and FIG. 14 is a cross-sectional view of the magnetic head 10C of FIG. 13 along a line Y—Y therein. It should be noted that, in FIGS. 11, 12 and 13, those parts identical to the corresponding parts of the magnetic head 10A of the first embodiment shown in FIGS. 6, 7, 8, 9 and 10 are given identical reference numerals and a description thereof is omitted.

Like the magnetic head 10A according to the first embodiment, the magnetic head 10C of the second embodiment of the present invention has an elevating force control slot 34C extending in a direction perpendicular to the direction of travel of the magnetic disk 32, that is, in the Y1–Y2 direction. Therefore the elevating force can be reduced because the air flow between the first and second air bearing surfaces 20, 22 and the magnetic disk 32 is vented through this elevating force control slot 34C, and so the magnetic disk 32 can be brought into close proximity with the first magnetic head unit 12 during magnetic recording and reproduction.

However, in contrast to the magnetic head 10A according to the first embodiment, in which the bottom surface of the elevating force control slot 34C is a slanting surface or a stepped surface, the magnetic head 10C according to the second embodiment has an elevating force control slot 34C that penetrates in a direction of a height of the slider 16B, that is, in a direction indicated by arrows Z1–Z2.

By providing an elevating force control slot 34C that penetrates in the Z1–Z2 direction according to the second embodiment, the air flow generated between the first and second air bearing surfaces 20, 22 and the magnetic disk 32 can be made to flow, that is, escape, along a rear surface as well as both sides of the slider 16B. As a result, the volume of air flow can be increased, and thus it is possible to reduce the elevating force exerted on the magnetic disk 32 and more reliably exhaust dust broken loose from the magnetic disk 32.

Additionally, in the magnetic head 10C according to the second embodiment a slanting slot 36 is formed in place of the incision 24 provided on the magnetic head 10A according to the first embodiment. In the second embodiment the slanting slot 36 is formed so as to be continuous with the central groove 18 and to have a depth which gradually increases from a position of formation of the elevating force control slot 34C toward a trailing direction, that is, a trailing edge side of the first or second magnetic head units 12, 14.

By providing the slanting slot 36, the air flow generated between the first and second air bearing surfaces 20, 22 and the magnetic disk 32 and flowing through the interior of the central groove 18 is guided by the slanting slot 36 so as to flow easily from the formation position of the elevating force control slot 34C toward the trailing direction. As a result, dust that has broken loose from the magnetic disk 32 is exhausted from the magnetic head 10C toward the trailing direction via the air flow over the slanting slot 36.

Accordingly, the adherence and accumulation of dust on the magnetic head 10C as well as damage to the magnetic disk 32 due to dust can be prevented. At the same time, optimum magnetic recording and reproduction can be achieved because a steady flow of air can be obtained and the separation distance between the first magnetic head unit 12 and the magnetic disk 32 can be stabilized.

The above description is provided in order to enable any person skilled in the art to make and use the invention and sets forth the best mode contemplated by the inventors of carrying out the invention.

The present invention is not limited to the specifically disclosed embodiments and variations, and modifications may be made without departing from the scope of the present invention.

What is claimed is:

1. A magnetic head having a leading edge side and a trailing edge side comprising:

a first magnetic head unit for recording to and reproducing from a first flexible recording medium;

a second magnetic head unit for recording to and reproducing from a second flexible recording medium having a coercive force lower than a coercive force of the first flexible recording medium;

a slider supporting the first magnetic head unit, the slider having a central groove separating a first air bearing surface at which the first magnetic head unit is provided and a second air bearing surface at which the second magnetic head unit is provided, the slider generating an elevating force from an air flow generated in a space between the first and second air bearing surfaces and the flexible recording media the slider having a height direction extending perpendicularly relative to said first and second air bearing surfaces;

the first air bearing surface having a width dimension A1 located on the leading edge side of the magnetic head and substantially perpendicular to a rotating direction extending from the leading edge side toward the trailing edge side, and a width dimension A1 located on the trailing edge side thereof and substantially perpendicular to said rotating direction, the width dimension A1 being larger than the width dimension A2; and an elevating force control slot formed on at least the first air bearing surface so as to extend in a direction substantially perpendicular to the rotating direction, the elevating force control slot having a depth D1 adjacent the central groove and a depth D2, adjacent the leading edge side of the magnetic head, greater than the depth D1.

2. The magnetic head as claimed in claim 1, wherein a bottom surface of the elevating force control slot is a slanting surface.

3. The magnetic head as claimed in claim 1, wherein at least one step portion is formed on the bottom surface of the elevating force control slot.

4. The magnetic head as claimed in claim 1, wherein a portion of the central groove in the vicinity of the first magnetic head penetrates in the height direction of the slider.

5. A magnetic head having a leading edge side and a trailing edge side comprising:

a first magnetic head unit for recording to and reproducing from a first flexible recording medium;

a second magnetic head unit for recording to and reproducing from a second flexible recording medium having a coercive force lower than a coercive force of the first flexible recording medium;

a slider supporting the first magnetic head unit, the slider having a central groove separating a first air bearing surface at which the first magnetic head unit is provided and a second air bearing surface at which the second magnetic head unit is provided, the slider having a height direction extending perpendicularly relative to the first and second air bearing surfaces, the slider generating an elevating force from air currents generated in a space between the first and second air bearing surfaces and the flexible recording media;

the first air bearing surface having a width dimension A1 located on the leading edge side of the magnetic head and substantially perpendicular to a rotating direction extending from the leading edge side toward the trailing edge side, and a width dimension A2 located on a trailing edge side thereof and substantially perpendicular to said rotating direction, the width dimension A1 being larger than the width dimension A2; and an elevating force control slot formed on at least the first air bearing surface so as to extend in a direction perpendicular to the direction extending from the leading edge side toward the trailing edge side and at the same time penetrate in the height direction of the slider.

6. The magnetic head as claimed in claim 5, wherein a depth of the central groove gradually increases as the central groove extends from a formation position of the elevating force control slot toward a trailing edge side of the first or second magnetic head units.

* * * * *